(12) United States Patent
Mahalingappa et al.

(10) Patent No.: US 12,186,879 B2
(45) Date of Patent: Jan. 7, 2025

(54) ADD-ON USER INTERFACE MODULE FOR PRECISION POWER TOOLS

(71) Applicant: Ingersoll-Rand Industrial U.S., Inc., Davidson, NC (US)

(72) Inventors: Suresh G. Mahalingappa, Bangalore (IN); Shivamurthi Gouda Kotagi, Bangalore (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 108 days.

(21) Appl. No.: 15/874,865

(22) Filed: Jan. 18, 2018

(65) Prior Publication Data

US 2019/0217460 A1    Jul. 18, 2019

(51) Int. Cl.
*B25F 5/02* (2006.01)
*B25F 5/00* (2006.01)
*H02K 7/14* (2006.01)

(52) U.S. Cl.
CPC ............... *B25F 5/02* (2013.01); *B25F 5/001* (2013.01); *H02K 7/14* (2013.01); *H02K 7/145* (2013.01)

(58) Field of Classification Search
CPC ........... B25F 5/02; B25F 5/001; H02K 7/145; H02K 7/14
USPC ....................................... 173/2–11, 176–183
See application file for complete search history.

(56) References Cited

U.S. PATENT DOCUMENTS

| | | | | |
|---|---|---|---|---|
| 3,221,192 A | * | 11/1965 | Franklin | H02P 7/295 310/68 R |
| 4,514,172 A | * | 4/1985 | Behringer | A61C 1/0007 433/126 |
| 4,810,137 A | * | 3/1989 | Yang | B25H 1/0042 408/100 |
| 4,978,877 A | * | 12/1990 | Quirijnen | H02K 23/18 310/229 |

(Continued)

FOREIGN PATENT DOCUMENTS

| | | | | |
|---|---|---|---|---|
| CA | 2586504 A1 | * | 11/2007 | ......... A61B 10/0041 |
| EP | 2072192 A1 | | 6/2009 | |

(Continued)

OTHER PUBLICATIONS

International Search Report Dated May 9, 2019, PCT/US2019/014347, Filing Date Jan. 18, 2019.

(Continued)

*Primary Examiner* — Robert F Long
(74) *Attorney, Agent, or Firm* — Kevin E. West; Advent, LLP (57) ABSTRACT

A power tool is provided. The power tool includes a rotatable tool holder adapted to receive a work instrument, a motor adapted to drive the rotation of the tool holder, a housing containing at least the motor and a handle extending therefrom that is configured to be gripped to manipulate the tool, a power source detachably coupled to the handle and adapted to deliver power to the motor, and an actuator adapted to select powered operation of the tool. The power tool may further include a user-interface module detachably coupled to the housing and configured to receive operational input, wherein the user-interface module communicates the operational input to the tool to govern the operational characteristics of the tool.

21 Claims, 4 Drawing Sheets

(56) References Cited

U.S. PATENT DOCUMENTS

| | | | | |
|---|---|---|---|---|
| 5,014,210 A * | 5/1991 | Postlewait | B23K 3/033 | 219/241 |
| 5,014,794 A * | 5/1991 | Hansson | B23Q 15/08 | 173/181 |
| 5,361,851 A * | 11/1994 | Fox | B25F 5/021 | 173/170 |
| 5,452,201 A * | 9/1995 | Pieronek | G05B 19/0421 | 700/83 |
| 5,491,418 A * | 2/1996 | Alfaro | G01R 31/007 | 340/3.1 |
| 5,540,706 A * | 7/1996 | Aust | A61B 17/32002 | 606/180 |
| 5,563,482 A * | 10/1996 | Shaw | B23P 19/066 | 318/272 |
| 5,588,041 A * | 12/1996 | Meyer, Jr. | H04M 1/6075 | 379/432 |
| 5,602,728 A * | 2/1997 | Madden | G05B 19/108 | 700/16 |
| 6,181,032 B1 * | 1/2001 | Marshall | B25F 3/00 | 200/321 |
| 6,237,811 B1 * | 5/2001 | Ford | A47J 31/401 | 99/287 |
| 6,267,602 B1 * | 7/2001 | Mendelson | H01R 13/6205 | 439/38 |
| 6,390,205 B2 * | 5/2002 | Wallgren | B25B 21/00 | 173/4 |
| 6,516,896 B1 * | 2/2003 | Bookshar | B23P 19/066 | 173/1 |
| 6,536,536 B1 * | 3/2003 | Gass | B25F 5/021 | 173/171 |
| 6,607,041 B2 * | 8/2003 | Suzuki | B25B 21/02 | 173/11 |
| 6,781,635 B1 * | 8/2004 | Takeda | A63F 13/77 | 348/E7.079 |
| 6,790,178 B1 * | 9/2004 | Mault | A61B 5/1118 | 600/300 |
| 6,821,157 B2 * | 11/2004 | Brandstrom | B25B 21/00 | 439/638 |
| 6,868,919 B1 * | 3/2005 | Manschitz | B25D 16/006 | 335/205 |
| 7,036,026 B2 * | 4/2006 | Hammer | G06F 1/1626 | 345/179 |
| 7,200,420 B2 * | 4/2007 | Rankin | H04M 1/7253 | 455/558 |
| 7,231,989 B2 * | 6/2007 | Salminen | E21B 44/00 | 173/4 |
| 7,346,847 B2 | 3/2008 | Etter et al. | | |
| 7,844,367 B2 * | 11/2010 | Nickerson | G05D 7/0676 | 700/284 |
| 7,918,230 B2 * | 4/2011 | Whitman | A61B 17/07207 | 227/19 |
| 7,926,141 B2 * | 4/2011 | Dayton | E04D 13/0765 | 15/23 |
| 7,963,433 B2 * | 6/2011 | Whitman | A61B 17/072 | 227/19 |
| 8,215,187 B2 | 7/2012 | Chen | | |
| 8,255,064 B2 * | 8/2012 | Chen | G05B 19/409 | 700/192 |
| 8,272,301 B2 | 9/2012 | Huang | | |
| 8,328,562 B1 * | 12/2012 | Rassoolkhani | H01R 13/2421 | 439/34 |
| 8,412,379 B2 * | 4/2013 | Gerio | B25J 13/06 | 901/1 |
| 8,544,559 B2 | 10/2013 | Fribert et al. | | |
| 8,857,533 B2 * | 10/2014 | Brodin | B25F 5/02 | 173/2 |
| 8,968,337 B2 * | 3/2015 | Whitfield | A61B 17/1285 | 606/143 |
| 9,573,056 B2 * | 2/2017 | Marks | A63F 13/06 | |
| 9,591,809 B2 * | 3/2017 | Gieske | A47L 9/2842 | |
| 9,878,432 B2 * | 1/2018 | Linehan | B25F 5/00 | |
| 10,090,616 B1 * | 10/2018 | Leimbach | A61B 17/07207 | |
| 10,131,043 B2 * | 11/2018 | Mergener | B25B 23/1475 | |
| 10,295,990 B2 * | 5/2019 | Dey, IV | G06F 3/04842 | |
| 10,418,879 B2 * | 9/2019 | Bartoszek | B25F 5/001 | |
| 10,464,200 B1 * | 11/2019 | Walter | B01F 15/00006 | |
| 10,513,184 B2 * | 12/2019 | Lee | G06F 3/0227 | |
| 10,729,443 B2 * | 8/2020 | Cabrera | A61B 17/1155 | |
| 10,849,711 B2 * | 12/2020 | Mata | A61B 90/361 | |
| 11,277,688 B2 * | 3/2022 | Ozcan | H04R 1/025 | |
| 11,511,974 B1 * | 11/2022 | Boushek | B66C 13/44 | |
| 11,541,521 B2 * | 1/2023 | Mergener | B23B 45/008 | |
| 2001/0025349 A1 * | 9/2001 | Sharood | H02J 13/0075 | 713/340 |
| 2001/0031975 A1 * | 10/2001 | Whitman | A61B 34/71 | 606/167 |
| 2002/0020538 A1 * | 2/2002 | Giardino | B25B 23/1405 | 173/176 |
| 2002/0033267 A1 * | 3/2002 | Schweizer | B25B 23/14 | 173/2 |
| 2002/0035876 A1 * | 3/2002 | Donaldson, Jr. | B25B 23/1456 | 73/862.21 |
| 2002/0050364 A1 * | 5/2002 | Suzuki | B25B 23/1405 | 173/1 |
| 2002/0134811 A1 * | 9/2002 | Napier | B24B 23/04 | 227/134 |
| 2003/0127932 A1 * | 7/2003 | Ishida | B25F 5/00 | 310/184 |
| 2004/0182175 A1 | 9/2004 | Day et al. | | |
| 2004/0182587 A1 * | 9/2004 | May | B25B 23/14 | 173/2 |
| 2005/0020909 A1 * | 1/2005 | Moctezuma de la Barrera | A61B 17/66 | 606/130 |
| 2005/0021245 A1 * | 1/2005 | Furuno | G06Q 10/10 | 702/33 |
| 2005/0187576 A1 * | 8/2005 | Whitman | A61B 17/068 | 227/176.1 |
| 2006/0009861 A1 * | 1/2006 | Bonasia | H04L 12/2809 | 700/18 |
| 2006/0020272 A1 * | 1/2006 | Gildenberg | A61B 17/29 | 606/144 |
| 2006/0076385 A1 * | 4/2006 | Etter | B23D 59/008 | 227/2 |
| 2006/0109246 A1 * | 5/2006 | Lee | G01D 5/145 | 345/163 |
| 2006/0254540 A1 * | 11/2006 | Tuttle | F01P 7/042 | 123/41.49 |
| 2007/0034394 A1 * | 2/2007 | Gass | B23B 31/123 | 173/2 |
| 2007/0035007 A1 * | 2/2007 | Dietz | H01L 25/0657 | 257/700 |
| 2007/0097255 A1 * | 5/2007 | Dalton | H04N 5/23293 | 348/373 |
| 2007/0097566 A1 * | 5/2007 | Woods | H02H 7/08 | 361/33 |
| 2007/0259594 A1 * | 11/2007 | Galbiati | A63H 5/00 | 446/15 |
| 2008/0134845 A1 * | 6/2008 | Shiao | B25B 23/1425 | 81/479 |
| 2008/0167736 A1 * | 7/2008 | Swayze | A61B 50/30 | 700/83 |
| 2008/0171475 A1 * | 7/2008 | Antsos | H01R 24/58 | 439/668 |
| 2008/0183190 A1 * | 7/2008 | Adcox | G16H 30/40 | 606/130 |
| 2008/0196910 A1 * | 8/2008 | Radle | B25F 5/00 | 173/2 |
| 2008/0252726 A1 | 10/2008 | Chan et al. | | |
| 2008/0296346 A1 * | 12/2008 | Shelton, IV | A61B 34/71 | 227/180.1 |
| 2009/0006970 A1 * | 1/2009 | Jeffery | G06Q 30/02 | 715/733 |
| 2009/0047629 A1 | 2/2009 | Kim | | |
| 2009/0095804 A1 * | 4/2009 | Agevik | G06F 1/1632 | 235/375 |
| 2009/0178519 A1 * | 7/2009 | Hsieh | B25B 23/1425 | 81/467 |

(56) References Cited

U.S. PATENT DOCUMENTS

| | | | |
|---|---|---|---|
| 2009/0182193 A1* | 7/2009 | Whitman | A61B 1/00133 600/104 |
| 2009/0200053 A1* | 8/2009 | Scrimshaw | B23B 31/123 173/47 |
| 2009/0205868 A1* | 8/2009 | Lane | E21B 44/00 175/24 |
| 2010/0030233 A1* | 2/2010 | Whitman | A61B 34/30 606/130 |
| 2010/0031348 A1* | 2/2010 | Lam | G06F 21/53 726/19 |
| 2010/0059240 A1* | 3/2010 | Schmidt | B25B 21/00 173/1 |
| 2010/0217719 A1* | 8/2010 | Olsen | G06F 21/00 705/318 |
| 2010/0265097 A1* | 10/2010 | Obatake | B25F 5/00 340/870.4 |
| 2010/0294829 A1* | 11/2010 | Giordano | A61B 17/068 227/176.1 |
| 2010/0314147 A1* | 12/2010 | Muller | B25F 5/006 173/171 |
| 2011/0073343 A1* | 3/2011 | Sawano | B25F 5/00 173/217 |
| 2011/0162858 A1* | 7/2011 | Coste | G07C 3/08 73/649 |
| 2011/0174099 A1* | 7/2011 | Ross | A61B 17/00 74/89.32 |
| 2011/0230209 A1* | 9/2011 | Kilian | H04M 1/72457 455/456.3 |
| 2011/0245833 A1* | 10/2011 | Anderson | B23B 49/02 606/80 |
| 2011/0248947 A1* | 10/2011 | Krahenbuhl | G06F 1/1671 345/174 |
| 2011/0257635 A1* | 10/2011 | Whitman | A61B 17/00 606/1 |
| 2011/0292588 A1* | 12/2011 | Seeley | G06K 19/07732 361/679.32 |
| 2012/0007748 A1* | 1/2012 | Forgues | B24D 13/10 340/870.07 |
| 2012/0037386 A1* | 2/2012 | Cook | B25F 5/021 173/30 |
| 2012/0050029 A1* | 3/2012 | Yu | B60C 23/0494 340/447 |
| 2012/0079923 A1* | 4/2012 | Huang | B25B 23/1425 81/479 |
| 2012/0089131 A1* | 4/2012 | Zemlok | A61B 17/07207 606/1 |
| 2012/0119919 A1* | 5/2012 | Chen | B25B 23/14 702/42 |
| 2012/0292070 A1* | 11/2012 | Ito | H02K 11/35 173/217 |
| 2012/0312570 A1* | 12/2012 | Wanek | B25F 5/00 173/1 |
| 2013/0058711 A1* | 3/2013 | Van Der Linde | F16M 13/02 403/349 |
| 2013/0098966 A1* | 4/2013 | Kostrzewski | A61B 17/07207 606/1 |
| 2013/0111347 A1* | 5/2013 | Reilly | G09B 5/065 715/716 |
| 2013/0133907 A1 | 5/2013 | Chen | |
| 2013/0172713 A1* | 7/2013 | Kirschenman | A61M 25/0113 600/373 |
| 2013/0193891 A1* | 8/2013 | Wood | H02P 6/08 318/434 |
| 2013/0245704 A1* | 9/2013 | Koltz | A61B 17/1622 606/1 |
| 2013/0293353 A1* | 11/2013 | McPherson | G06K 19/07798 340/10.1 |
| 2013/0308254 A1* | 11/2013 | Checchi | A47F 7/286 361/679.01 |
| 2013/0327552 A1* | 12/2013 | Lovelass | B25F 5/001 173/176 |
| 2014/0008088 A1* | 1/2014 | Chellew | B25F 5/021 173/20 |
| 2014/0025046 A1* | 1/2014 | Williams | A61B 17/07207 606/1 |
| 2014/0025834 A1* | 1/2014 | Mergener | H04L 67/51 709/230 |
| 2014/0051304 A1* | 2/2014 | Hoegerle | A61B 90/98 439/660 |
| 2014/0052135 A1* | 2/2014 | Aman | A61B 17/16 606/79 |
| 2014/0159662 A1* | 6/2014 | Furui | B25F 5/02 320/112 |
| 2014/0162502 A1* | 6/2014 | Geiler | H01R 13/2421 439/700 |
| 2014/0240125 A1* | 8/2014 | Burch | G06Q 10/06 340/539.13 |
| 2014/0257353 A1* | 9/2014 | Whitman | A61B 17/07207 606/167 |
| 2014/0282746 A1* | 9/2014 | Lin | H04N 21/47217 725/61 |
| 2015/0053737 A1* | 2/2015 | Leimbach | G16H 40/63 227/175.1 |
| 2015/0135306 A1* | 5/2015 | Winkler | G06F 12/00 726/17 |
| 2015/0272572 A1* | 10/2015 | Overmyer | A61B 90/98 227/177.1 |
| 2015/0272575 A1* | 10/2015 | Leimbach | A61B 90/96 227/175.3 |
| 2015/0280384 A1* | 10/2015 | Leimbach | H01R 35/025 227/175.1 |
| 2015/0296050 A1* | 10/2015 | Bomkamp | H04W 4/80 709/217 |
| 2015/0316913 A1* | 11/2015 | Rickey | B25F 5/00 700/180 |
| 2015/0374366 A1* | 12/2015 | Zergiebel | A61B 17/068 74/89.23 |
| 2016/0217004 A1* | 7/2016 | Lin | G06F 21/604 |
| 2016/0226278 A1* | 8/2016 | Wenger | H02J 7/0044 |
| 2016/0256164 A1* | 9/2016 | Heinrich | A61B 17/072 |
| 2016/0310134 A1* | 10/2016 | Contini | A61B 17/0686 |
| 2016/0311094 A1* | 10/2016 | Mergener | H02J 7/0024 |
| 2016/0342151 A1* | 11/2016 | Dey, IV | G05B 19/4155 |
| 2016/0354913 A1* | 12/2016 | Madineni | H02K 7/145 |
| 2016/0378097 A1* | 12/2016 | Crescenti | G05B 19/408 700/170 |
| 2017/0014984 A1* | 1/2017 | Rola | B25F 5/00 |
| 2017/0086932 A1* | 3/2017 | Auld | A61B 17/3421 |
| 2017/0150032 A1* | 5/2017 | Chenn | H04N 23/66 |
| 2017/0201853 A1* | 7/2017 | Chen | G05B 13/04 |
| 2017/0222382 A1 | 8/2017 | Peloquin et al. | |
| 2017/0348815 A1* | 12/2017 | Schadow | B24B 23/028 |
| 2017/0368674 A1* | 12/2017 | Wise | B25B 23/15 |
| 2018/0049794 A1* | 2/2018 | Swayze | B25J 13/089 |
| 2018/0056496 A1* | 3/2018 | Rubens | B44B 7/02 |
| 2018/0076639 A1* | 3/2018 | Furui | H02J 7/00 |
| 2018/0126537 A1* | 5/2018 | Tanaka | G05B 13/024 |
| 2018/0132850 A1* | 5/2018 | Leimbach | A61B 90/96 |
| 2018/0138839 A1* | 5/2018 | Puzio | H02K 11/28 |
| 2018/0178366 A1* | 6/2018 | Matei | B25B 21/00 |
| 2018/0185993 A1* | 7/2018 | Hita | B25B 23/147 |
| 2018/0354114 A1* | 12/2018 | Bantle | B25B 21/02 |
| 2018/0361559 A1* | 12/2018 | Bantle | B25D 11/102 |
| 2019/0022836 A1* | 1/2019 | Chu | G01L 25/003 |
| 2019/0043292 A1* | 2/2019 | Hoossainy | G07C 9/30 |
| 2019/0125458 A1* | 5/2019 | Shelton, IV | A61B 17/1155 |
| 2019/0183494 A1* | 6/2019 | Shelton, IV | A61B 17/07207 |
| 2019/0200977 A1* | 7/2019 | Shelton, IV | A61B 17/068 |
| 2019/0261084 A1* | 8/2019 | Ozcan | H04R 3/04 |
| 2019/0298122 A1* | 10/2019 | Tahara | A47L 9/242 |
| 2019/0299375 A1* | 10/2019 | Cabrel | G06K 19/0723 |
| 2019/0328402 A1* | 10/2019 | McGinley | A61B 90/30 |
| 2020/0078113 A1* | 3/2020 | Sawhney | A61B 90/361 |
| 2020/0204835 A1* | 6/2020 | Reilly | H04W 4/80 |
| 2020/0222050 A1* | 7/2020 | Eisinger | A61B 17/1155 |
| 2020/0237446 A1* | 7/2020 | Drain | A61B 34/20 |
| 2020/0405304 A1* | 12/2020 | Mozdzierz | A61B 17/072 |

(56) References Cited

U.S. PATENT DOCUMENTS

| | | | |
|---|---|---|---|
| 2021/0205976 A1* | 7/2021 | Matei | G08B 7/06 |
| 2021/0245267 A1* | 8/2021 | Crivella | B23B 35/00 |
| 2021/0252652 A1* | 8/2021 | Mueckl | B23Q 5/043 |

FOREIGN PATENT DOCUMENTS

| | | | | |
|---|---|---|---|---|
| GB | 2376758 A | | 12/2002 | |
| GB | 2594945 A | * | 11/2021 | ............ B23D 47/00 |
| JP | 2007140937 A | * | 6/2007 | |
| JP | 2013-208680 A | | 10/2013 | |
| WO | 2009047629 A1 | | 4/2009 | |
| WO | 2012134469 A1 | | 10/2012 | |
| WO | 2013014914 A2 | | 1/2013 | |
| WO | 20150061370 A1 | | 4/2015 | |

OTHER PUBLICATIONS

Written Opinion of the International Searching Authority Dated May 9, 2019, PCT/US2019/014347, Filing Date Jan. 18, 2019.
Extended European Search Report for European Application No. 19741855.1, dated Oct. 6, 2021 (date of completion of the search Sep. 23, 2021).

\* cited by examiner

ADD-ON USER INTERFACE MODULE FOR PRECISION POWER TOOLS

BACKGROUND

Technical Field

The present disclosure relates to power tools, and in particular to precision power tools.

State of the Art

Power tools are utilized in many industries to provide a mechanical advantage to their users. These power-driven tools provide force, torque, and/or impact not otherwise achievable under man power alone. Moreover, many of these tools are designed to be hand-portable and battery-driven, making them ever more useful over an increasingly wider range of applications.

Present-day precision power tools employ a display, keypad and wireless communication circuits (together called user interface module or UI module) built into the power tool. With a UI module: (1) servicing the UI module may require recall of the entire power tool; (2) the industry uses separate power tools for fixed precision and programmable precision; and (3) upgrading for better display and new wireless features for tools already in service may be more involved.

There is thus a need in the industry to develop measures to allow adaptability and provide flexibility for precision power tools, and in particular those with the UI module.

SUMMARY

The present disclosure relates to power tools, and in particular to precision power tools.

An aspect of the present disclosure includes a power tool comprising: a rotatable tool holder adapted to receive a work instrument; a motor adapted to drive the rotation of the tool holder; a housing containing at least the motor and a handle extending therefrom that is configured to be gripped to manipulate the tool; a power source detachably coupled to the handle and adapted to deliver power to the motor; an actuator adapted to select powered operation of the tool; and a user-interface module detachably coupled to the housing and configured to receive operational input, wherein the user-interface module communicates the operational input to the tool to govern operational characteristics of the tool.

Another aspect of the present disclosure includes wherein the user-interface module further comprises a digital display, a user input, and wireless communication capabilities.

Another aspect of the present disclosure includes wherein the operational input comprises electric power characteristics, motor control characteristics, or operational mode status.

Another aspect of the present disclosure includes wherein the operational input is received from a user or a remotely positioned wireless communication device.

Another aspect of the present disclosure includes wherein the user-interface module is selectable between active and inactive states, wherein with the user-interface module in the active state the tool operates as a programmable precision tool and with the user-interface module in the inactive state the tool operates as a fixed precision tool.

Another aspect of the present disclosure includes wherein detaching the user-interface module from the housing sets the tool in a default mode as a fixed precision tool.

Another aspect of the present disclosure includes wherein the user-interface module is configured to draw electric power from the power source, and wherein the power tool and the user-interface module are configured to communicate data between one another.

Another aspect of the present disclosure includes a power tool system comprising: a power tool comprising: a rotatable tool holder configured to receive a work instrument; a motor adapted to drive the rotation of the tool holder; a housing containing at least the motor and a handle extending therefrom configured to be gripped to manipulate the power tool; a power source detachably coupled to the handle and configured to deliver power to the motor; an actuator configured to be actuated to select powered operation of the power tool; and a user-interface module comprising: a digital display; and an input device for receiving programmable instruction, wherein the module detachably couples to the housing to switch the power tool from a fixed precision mode to a programmable precision mode.

Another aspect of the present disclosure includes a method of operating a power tool comprising: providing a fixed precision power tool having a default operation mode; operating the power tool according to the default operation mode; detachably coupling a user-interface module to the power tool; reprogramming the operation of the power tool to a programmed operation mode through the user interface module; and operating the power tool according to the programmed operation mode.

Another aspect of the present disclosure includes detaching the user-interface module to return the power tool to the fixed precision power mode.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict illustrative embodiments of a power tool 10. The embodiments may comprise various structural and functional components that complement one another to provide the unique functionality and performance of the tool 10, the particular structure and function of which will be described in greater detail herein. For example, embodiments of the tool 10 may comprise a power tool and a detachable user interface (UI), as well as other structural and functional components, that may be capable of establishing electrical, physical, and communications connectivity to or with one another to perform their respective intended functions.

Figure 1:
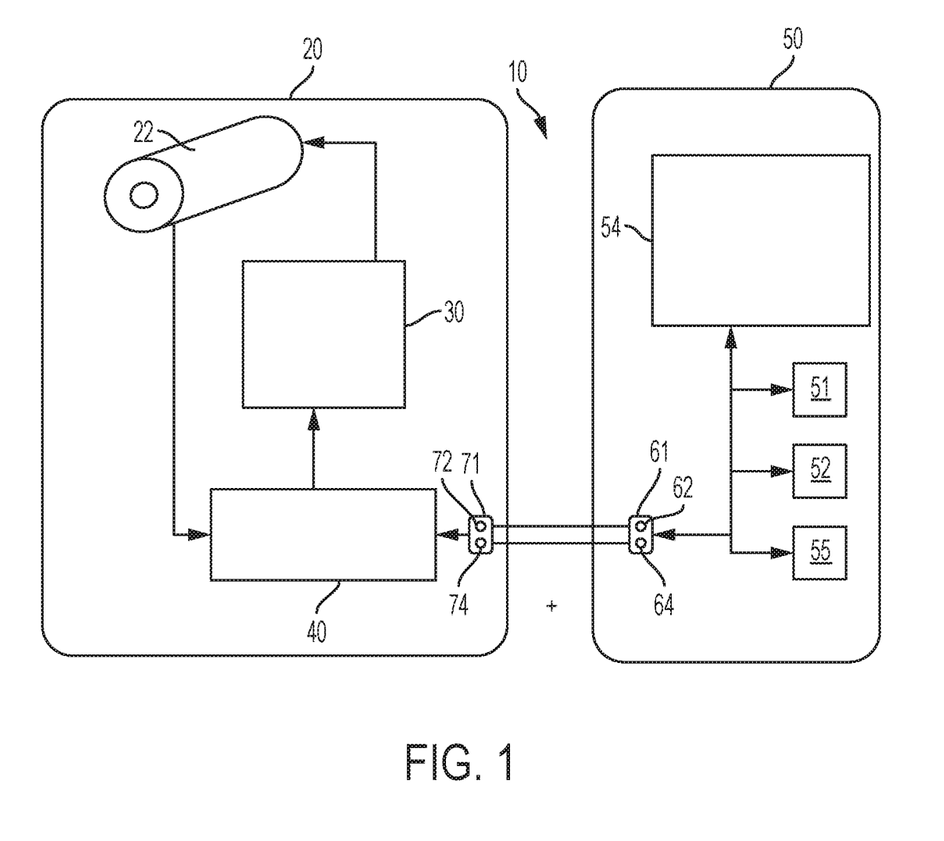
FIG. 1 is a block diagram of an embodiment of a power tool having a detachable user-interface in accordance with the present disclosure.
Figure 2:
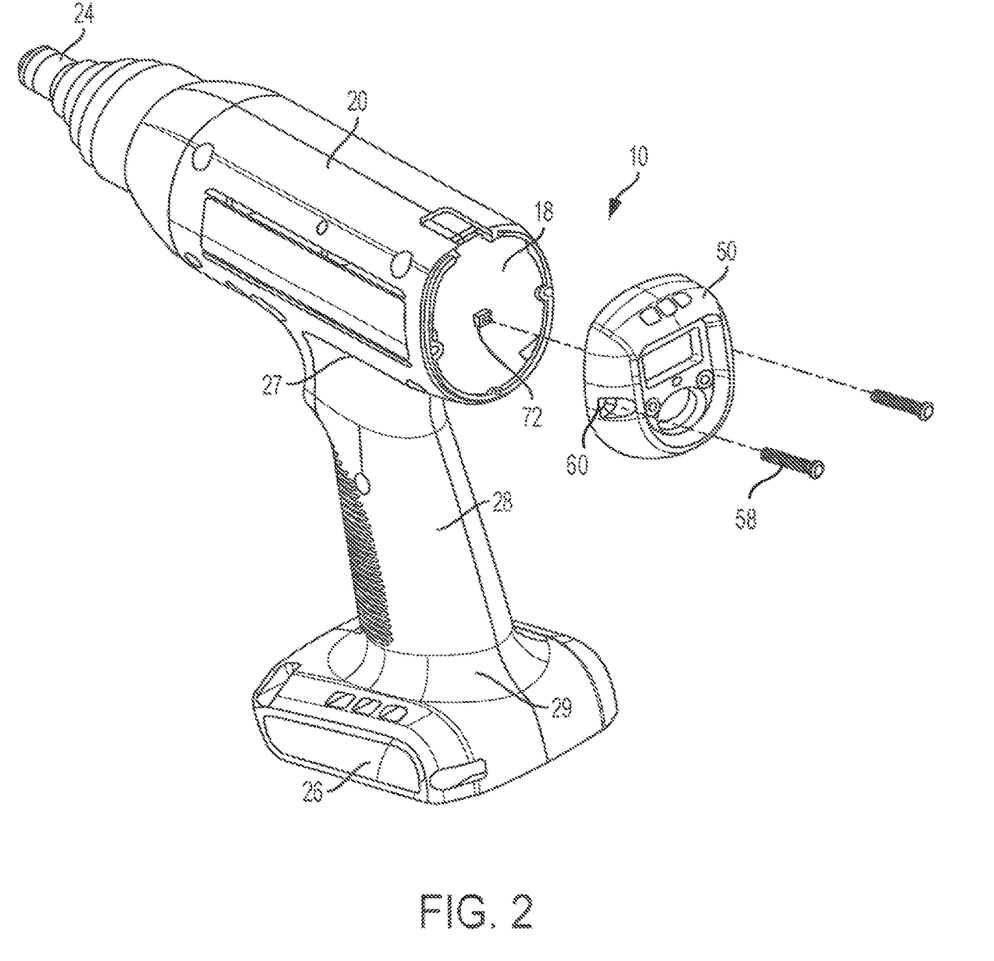
FIG. 2 is a side view of an embodiment of a power tool having a detachable user-interface in accordance with the present disclosure.
Figure 3:
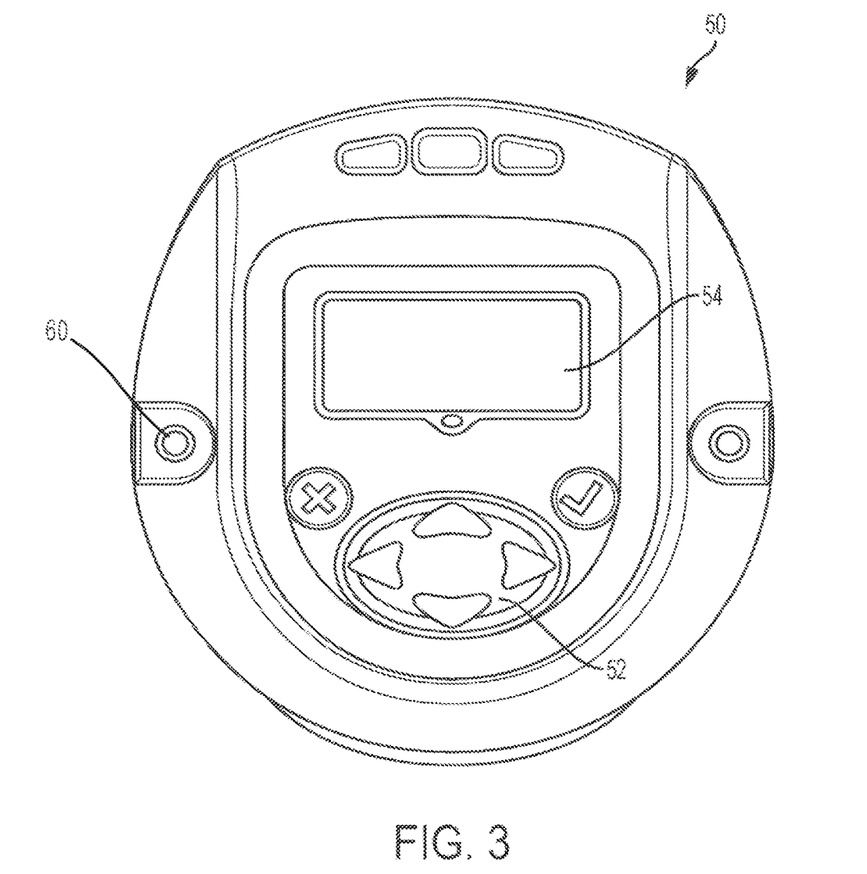
FIG. 3 is a front view of an embodiment of a detachable user-interface of a power tool in accordance with the present disclosure.

Referring to the drawings, FIGS. 1-3 depict an embodiment of the power tool 10 comprising a housing 20 that encloses a source of motion, such as, for example, a motor 22. The motor 22 may be configured to drive a gear mechanism, a tool holder, a drive shaft, or a spindle 24. Further, the gear mechanism may be configured to receive the input of the motor 22 and translate, reduce, or increase the rotary motion of the motor 22 to the output motion of the tool holder, the drive shaft, or the spindle 24. The motor 22 may be, for example, a brushless DC electric motor powered by DC electricity via an inverter or switching power supply which produces an AC electric current to drive each phase of the motor via a closed loop controller. The controller provides pulses of current to the motor windings that control the speed and torque of the motor 22. The spindle 24 may be configured to releasably retain or hold a tool bit or a work instrument (i.e., drill bit or the like) by which the tool 10 is able to operate on a workpiece. In other words, with the work instrument satisfactorily attached to the spindle 24, the tool 10 may provide the mechanical power to permit the work instrument to perform the intended operation on the workpiece.

Embodiments of the power tool 10 may comprise the motor 22 being configured to drive a shaft, either directly or through a gear mechanism, that provides the mechanical output to power or drive the operational aspects of the power tool 10. For example, the motor 22 may be configured to drive the shaft in a rotary motion to drive components of the power tool 10, such as the spindle 24 and the tool bit coupled thereto.

Embodiments of the power tool 10 may further comprise a power source 26 that provides power to the motor 22. The power source 26 may be configured to be detachably coupled to the power tool 10. For example, the power source 26 may be a portable and/or rechargeable power source, such as, for example, a rechargeable battery that may be configured to physically couple to the power tool 10 at a handle or grip portion 28 that extends outwardly from the housing 20. Specifically, the grip portion 28 may have a first end 27 and a second end 29, the first end 27 being coupled to the housing 20 and the second end 29 being configured to have detachably coupled thereto the power source 26. In this way, the power source 26, such as the battery, may electrically drive the motor 22. Alternatively, the power source 26 may be a hydraulic or pneumatic power source, such as, for example, a high pressure, compressed fluid source (e.g., air compressor or water pump) that may be operatively coupled by hose to the second end 29 of the grip portion 28. In this way, the compressed fluid may pneumatically or hydraulically drive the motor and thereby the operational aspects of the power tool 10.

Embodiments of the power tool 10 may comprise an actuator 21 that may operatively and selectively couple the power source 30 to the motor. The actuator 21 may be configured to activate a switch (not depicted) for selectively actuating the motor by providing or restricting power thereto, as the case may be. For example, actuating the actuator 21 from a resting state to an engaged state may operatively couple the power source 26 to the motor 22, and releasing the actuator 21 from the engaged state to the resting state may decouple the power source 26 from the motor 22. Embodiments of the power tool 10 may further comprise a reversing switch (not shown) that selectively reverses a direction (i.e., clockwise or counterclockwise) in which the motor 22 drives the tool holder, the drive shaft, or the spindle 24. As depicted, the power tool 10 may be a battery-powered, cordless impact drill. However, the power tool 10 may be any type of corded, cordless, pneumatic, electric, or combustion powered tool, such as, for example, a screwdriver, an impact driver or wrench, a hammer, a hammer drill, a nailer, a stapler, a saw, a grinder, a sander, a router, and/or a flashlight, just to name a few.

Embodiments of the tool 10 may further comprise a control unit 30 for governing the operational aspects of the tool 10. The control unit 30 may be a power board or a printed circuit board (PCB) having at least one processor (e.g., a microprocessor or microcontroller), which may be configured to operate according to instructions, algorithms, or program code and data stored in its memory. The memory may comprise non-volatile, read-only memory (ROM) and/or rewriteable memory, such as one or more EEPROMs and flash memory or mechanically addressable memory, such as a hard drive. The memory may also include volatile memory, such as RAM, DRAM and SRAM. The memory may be configured to store one or more predetermined values, data, or operational programs.

Embodiments of the power tool 10 may further comprise the control unit 30 being configured to permit or restrict some of the general operational aspects of the power tool 10. For example, the control unit 30 may be configured to sense the state of the actuator 21, such that under the condition the actuator 21 is transitioned from the resting state to the engaged state the control unit 30 permits the motor 22 to operate by drawing power from the power source 26, and such that under the condition the actuator 21 is released from the engaged state to the resting state the control unit 30 instructs the motor 22 to halt by disengaging the motor 22 from the power source 26. For example, when an operator depresses the actuator 21, the control unit 30 instructs the power source 26 to provide power to the motor 22 and when the operator releases the actuator 21, the control unit 30 instructs the power source 26 to cut power to the motor 22. The control unit 30 may also be configured to be in operative communication with the motor 22, such as to enable power switching.

Embodiments of the tool 10 may further comprise an intelligent motor control board (MCB) 40. The MCB 40 may be a power board or a printed circuit board (PCB) having at least one processor (e.g., a microprocessor or microcontroller), which may be configured to operate according to instructions, algorithms, or program code and data stored in its memory. The memory may comprise non-volatile, read-only memory (ROM) and/or rewriteable memory, such as one or more EEPROMs and flash memory or mechanically addressable memory, such as a hard drive. The memory may also include volatile memory, such as RAM, DRAM and SRAM. The MCB 40 may also be configured to be in communication with the motor 22 and with one or more sensors (not depicted), such as Hall sensors, torque sensors, angle sensors, or other signal sensors, which may themselves be in operative communication with the motor 22 or other component parts of the tool 10. As such, the sensors may be configured to sense one or more operational characteristics of the motor 22, such as speed, torque, rotational angle, etc., and communicate these sensed characteristics to the MCB 40. Thereafter, or based on the sensed characteristics received, the MCB 40 may be configured to provide operational input to the control unit 30 to govern the operational aspects of the motor 22. For example, the MCB 40 may be configured to send a pulse-width modulation (PWM) signal to the control unit 30, to thereby direct operational aspects of the motor 22 and thus the tool 10. Embodiments of the tool 10 may comprise the control unit 30 and the MCB 40 being part and portion of the same printed circuit board (PCB) and thus share component parts thereof.

Embodiments of the tool may further comprise a user-interface module (UIM) 50. The UIM 50 may be designed and configured to permit a user to provide input or instruction to, program, direct, or otherwise communicate with the tool 10. The UIM 50 may be configured on or near the back end 18 of the housing 20. Alternatively, UIM 50 may be configured on another portion of the housing 20, such as, for example, on a side surface, top surface, etc. The UIM 50 may be configured to receive the input from the user and communicate such direction to the tool 10, and in particular to one or more of the control unit 30 and the MCB 40, such that the control unit 30 and/or the MCB 40 can govern or otherwise direct the operational aspects of the tool 10 as desired by the user.

Embodiments of the tool 10 may further comprise a processing unit 55 for governing the operational aspects of the UIM 50. The processing unit 55 may be a power board or a printed circuit board (PCB) having at least one processor (e.g., a microprocessor or microcontroller), which may be configured to operate according to instructions, algorithms, or program code and data stored in its memory. The memory may comprise non-volatile, read-only memory (ROM) and/or rewriteable memory, such as one or more EEPROMs and flash memory or mechanically addressable memory, such as a hard drive. The memory may also include volatile memory, such as RAM, DRAM and SRAM. The memory may be configured to store one or more predetermined values, data, or operational programs. The processing unit 55 may be configured to update, revise, bring-up-to-date, alter, adapt, amend, adjust, modify, or otherwise change the instructions, algorithms, or program code and data stored in its memory according to new instructions, data, or programming received from an input device 52 or an external source 70, to be described in greater detail herein.

The UIM 50 may comprise one or more input devices 52, such as a keypad or keyboard, configured to receive one or more input parameters 56. The input parameters 56 may be configured to govern the operational aspects of the tool 10. For example, the input parameters may be predetermined operating values within which the tool 10 is to operate. The input parameters 56 may be one or more programs that update, revise, change, adapt, bring current, or otherwise control or govern the operational aspects of the tool 10.

The input parameters 56 may be provided to the power tool 10 by an external source 70. The external source 70 may be, for example, a user or operator of the power tool 10. For example, the external source 70 may be a user or operator that physically utilizes or operates the one or more input devices 52 to input, or otherwise communicate, the one or more input parameters 56 to the UIM 50 and/or the power tool 10.

The UIM 50 may further comprise a wireless communication circuit 51. The wireless communication circuit 51 may be adapted to receive by wireless communication a signal, data, or communication from a remotely located external source 70. For example, the external source 70 may be an external input device (not depicted), such as a computer or other internet-enabled or wireless communication device, capable of wired or wireless electronic communication with the UIM 50, and thus with the power tool 10, to provide operating instruction and/or input parameters 56 to the tool 10. In addition thereto, the wireless communication circuit 51 may also be adapted to receive wired communication from the external source 70, as the case may be.

Embodiments of the tool 10 may further comprise the UIM 50 having a display 54. The display 54 may comprise any digital device which can be perceived by a user and is capable of visually communicating information from the UIM 50 or the power tool 10 to the user. The display 54 may be, for example, a liquid crystal display (LCD), a light-emitting diode (LED) display, including an organic LED (OLED) display, or an organic electroluminescent (EL) display. Moreover, embodiments of the display 54 may be configured as a touch pad that enables the display 54 to operate not only as a visual display but also as the input device 52 to permit the user to input the one or more instructions, programs, and/or input parameters 56 into the UIM 50 and/or the power tool 10.

Embodiments of the power tool 10 may comprise the display 54 being part of the power tool 10 on a separate portion of the housing 20 apart from the UIM 50, but nevertheless configured to be in operational communication with the UIM 50. The display 54, whether integral with the UIM 50 or as a separate component of the power tool 10 in operational communication with the UIM 50, may be configured or adapted to display any of the information that was described above or below, such as but not limited to, input parameters 56, operation modes, locked or unlocked modes, remaining battery capacity, number of additional power tool operations that may be performed in view of the remaining battery capacity, tool identification information, current limit threshold, battery discharge threshold, etc.

Embodiments of the power tool 10 may comprise the UIM 50 further comprising the processing unit 55 being configured to govern the operational aspects of the UIM 50, including but not limited to receiving input from the input device 52, displaying information on the display 54, communicating with the power tool 10 and its associated control unit 30 and MCB 40, and communicating with the user and/or the external source 70. Embodiments of the power tool 10 may comprise the UIM 50 further comprising being configured to borrow the processing power of the power tool 10, including component parts of the control unit 30 and/or the MCB 40 to govern the operational aspects of the UIM 50, including but not limited to receiving input from the input device 52, displaying information on the display 54, communicating with the power tool 10 and its associated control unit 30 and MCB 40, and communicating with the user and/or the external source 70.

Embodiments of the power tool 10 may comprise the UIM 50 being a separate component apart from the tool 10, but configured to detachably couple to the housing 20. In other words, the UIM 50 may be configured to be physically coupled to (e.g., via receipt of a fastener 58 through an aperture 60 formed through the UIM 50) or detached from the housing 20. In this embodiment, with the UIM 50 in physical contact with the housing 20, the UIM 50 may be configured to have one or more communication links that correspond to cooperative communication links on the housing 20 of the tool 10. For example, the UIM 50 may have at least a power communication link 62 and a data communication link 64 that correspond to and communicate with at least a corresponding power communication link 72 and a data communication link 74 of the tool 10, the power communication link 72 and the data communication link 74 being in operative communication with one or more of the MCB 40 and the control unit 30. As such, under the condition the UIM 50 is releasably coupled to the housing 20, the power communication link 62 and the data communication link 64 are placed in operative communication with the corresponding power communication link 72 and the data communication link 74, respectively, such that power and data can flow or otherwise be provided between the tool 10 and the UIM 50. In this way, the instructions received by the UIM 50 from the external source 70 (i.e., user or remotely located wireless communication device) can be transmitted from the UIM 50 to the component parts of the tool 10, such as the MCB 40 and/or the control unit 30, and vice versa, to govern operations of the tool 10.

Embodiments of the tool 10 may comprise the tool 10 and the UIM 50 being adapted to connect to one another by a receptacle and plug configuration. For example, the tool 10 may comprise the receptacle component 71 on a back end of the housing 20, whereas the UIM 50 may comprise the corresponding plug component 61 on its back face (i.e., facing away from the side of the display 54). As such, when the UIM 50 is brought into proximity with the back end 18 of the housing 20, the UIM 50 can not only physically couple to the housing 20 but also electrically and operatively couple to the receptacle 71 by way of the plug 62. Alternatively, embodiments of the tool 10, having the UIM 50 coupled thereto, may comprise the plug being positioned on the housing 20 and the receptacle positioned on the UIM 50.

Embodiments of the tool 10 may comprise the tool 10 being adapted to function according to a pre-programmed operation mode stored in the control unit 30 and/or MCB 40. Thus, without the input from the UIM 50, the tool 10 may nevertheless function according to this predetermined mode. The tool 10 operating according to this configuration may be considered a fixed precision power tool or a tool having a fixed-precision operating mode. This may also be considered a default mode of operation. In this configuration, the tool 10 may operate in the fixed precision mode without the UIM 50 physically coupled to the tool 10, or, alternatively, the tool 10 may operate in the fixed precision mode with the UIM 50 coupled to the tool 10 but in an inactive state.

However, as described herein, embodiments of the tool 10 may comprise the UIM 50 being configured to physically releasably couple to the housing 20, such that the power communication link 62 and the data communication link 64 of the UIM 50 are placed in operative communication with the corresponding power communication link 72 and the data communication link 74 of the housing 20, respectively, such that power and data can flow, or otherwise be provided, between the tool 10 and the UIM 50. Thus, with the UIM 50 connected to the tool 10 and in operative communication with the control unit 30 and/or MCB 40, the UIM 50 may provide adaptive capabilities to the tool 10 to allow the tool 10 to switch between operational modes or functions, or at the very least allow the user, or external source 70, to direct operations of the tool. For example, for a first set of tasks the user, or external source 70, may configure the tool 10 through the UIM 50 to operate according to a first set of operational standards and for a second set of tasks the user, or external source 70, may configure the tool 10 through the UIM 50 to operate according to a second set of operational standards, and so on and so forth.

Figure 4:
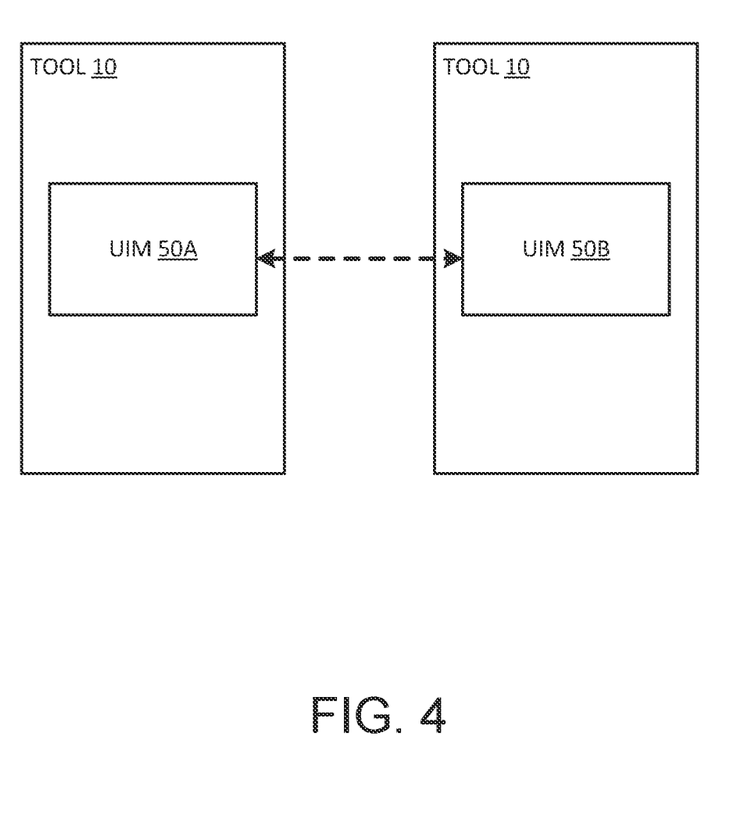
FIG. 4 is a block diagram of an embodiment of a power tool having interchangeable, detachable user interfaces in accordance with the present disclosure.

Several advantages over conventional power tools can be achieved by separating the UIM 50 from the tool 10, or at least allowing the UIM 50 to be detachably coupled to the tool 10. For example, the tool 10 may be configured with the physical hardware that enables the tool 10 to function in more than one mode of operation. The tool 10 may be configured to operate as a drill, an impact wrench, or other mode of operation with the same tool family. But, the physical capabilities of the tool 10 may be governed by the instructions provided to the tool 10 by the UIM 50. For example, the UIM 50 may be attached to the tool 10 to communicate to the tool 10 in which mode of operation the tool 10 is to operate (i.e., whether to operate as a drill or as an impact wrench, or the like). Thereafter, the user, or the external source 70, may communicate with the UIM 50, by the input device 52 or wireless signal, to change or alter the operational aspects of the tool 10 (i.e., to switch to another operation of the drill, impact wrench, or the like). Alternatively, to change the operational aspects of the tool 10, the user may simply interchange one UIM 50 that directs the tool 10 in one mode of operation for another UIM 50 that directs the tool 10 in a second mode of operation, an example of which is shown in FIG. 4 with UIM 50A interchanged with UIM 50B in the tool 10. In this way, the tool 10 may function as multiple products within the same tool family, simply by changing the operation through the UIM 50 or switching out the UIM 50.

Additional advantages include serviceability, scalability, upgradeability, and reduced costs. Embodiments of the tool 10 comprising the UIM 50 allow for repair of the components of the UIM 50 (i.e., the display 54, the input device 52, and the wireless communication circuit 51) without having to send in or return the entire device. Embodiments of the tool 10 comprising the UIM 50 allow for the tool 10 to receive performance improvements in the UIM 50, such as better display or improved wireless communication features. Instead of needing to purchase an entirely new tool 10, the customer need only purchase an updated or revised UIM 50. Thus, as improvements are made to wireless technology, tool programming, user input features, and/or display features, these improvements can be provided to each tool 10 through the UIM 50 without having to replace the entire tool 10. Such adaptability allows for reduced costs of tool redesign as well as warranty claims, given that the tool 10 may be improved simply by updating and interchanging the UIM 50.

Embodiments of the tool 10 may thus provide for the operation of the tool 10 between a fixed precision mode (without the UIM 50 attached or attached but in an inactive state) and a programmable precision mode where the UIM 50 provides adaptable, programmable instructions to the tool 10 to vary the operations of the tool 10 according to the needs of the user, or the external source 70. Indeed, the user, or external source 70, may switch between these varied modes of operation of the tool 10 by simply communicating the same to the tool through the UIM 50.

In conjunction with the structural components described above and their associated function described herein, a method of operating the power tool 10 and the UIM 50 may include the steps of providing a fixed precision power tool having a default operation modem, operating the power tool according to the default operation mode, detachably coupling a user-interface module to the power tool, reprogramming the operation of the power tool to a programmed operation mode through the user interface module, and operating the power tool according to the programmed operation mode. Embodiments of the method of operation may further comprise detaching the user-interface module to return the power tool to the fixed precision power mode, programming the operation of the power tool by a user, programming the operation of the power tool by an external source, such a remotely-located wireless communication enabled device, altering the operation of the power tool by exchanging one user interface device for another, and updating the programming of the power tool and/or the user interface device by connecting the user interface device to a computer and downloading the new program or software. Embodiments of the method of operation may further comprise repairing the user interface module of the power tool by sending in only the user interface module for repair without the power tool, updating the functionality of the power tool by replacing only the user interface module, and extending the life of the power tool by replacing defective parts of the user interface module without having to replace the power tool itself. Other steps of the method of operation may be apparent to one of ordinary skill in the art based off of the disclosure included herein.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A power tool comprising:
   a rotatable tool holder adapted to receive a work instrument;
   a motor adapted to drive the rotation of the tool holder;
   a housing containing at least the motor;
   a handle having a first end and a second end opposite the first end, the first end coupled to the housing to position the handle extending from the housing and to provide a grip to manipulate the tool;
   a power source detachably coupled to the second end of the handle and adapted to deliver power to the motor;
   an actuator adapted to select powered operation of the tool; and
   a user-interface module comprising a digital display, a user input, and wireless communication capabilities;
   wherein the user-interface module is detachably coupled directly to the housing and configured to receive operational input, wherein the user-interface module communicates the operational input to a controller of the tool to govern operational modes of the tool, the controller located within the housing;
   wherein the user-interface module is detachably coupled directly to the housing via receipt of a fastener through an aperture formed through the user-interface module to interchangeably transition between an attached state and a detached state, wherein
   in the attached state, the user-interface module is an integral part of the housing and creates a housing and user-interface module combination with the user-interface module configured to receive operational input and communicate the operational input to the tool to govern operational modes of the tool which results in a programmed operational mode of the tool in the attached state, and
   the detached state includes the user-interface module detached from the housing with the tool set in a pre-programmed default mode as a fixed tool such that the tool operates in the default mode, where the default mode of the tool is different from the programmed operational mode of the tool and operates according to pre-programmed operations stored in the controller of the tool,
   wherein the tool is configured to revert to the default mode upon transitioning from the attached state to the detached state, and
   wherein the user-interface module is a first user-interface module, and wherein the power tool further comprises a second user-interface module interchangeable with the first user-interface module, the second user-interface module configured to detachably couple with the housing separately from the first user-interface module, wherein when the second user-interface module is attached to the housing to create a second housing and user-interface module combination, the second housing and user-interface module combination enables the tool to be programmed via the second user-interface module such that the second housing and user-interface module combination provides operational input to the tool which results in a second programmed operational mode of the tool that is different from each of the default mode of the tool and the programmed operational mode of the tool.

2. The power tool of claim 1, wherein the operational input comprises electric power characteristics, motor control characteristics, or operational mode status.

3. The power tool of claim 1, wherein the operational input is received from a user or a remotely positioned wireless communication device.

4. The power tool of claim 1, wherein the user-interface module is selectable between active and inactive states.

5. The power tool of claim 4, wherein with the user-interface module in the active state the tool operates as a programmable tool.

6. The power tool of claim 4, wherein with the user-interface module in the inactive state the tool operates as a fixed tool.

7. The power tool of claim 1, wherein the user-interface module is configured to draw electric power from the power source.

8. The power tool of claim 1, wherein the power tool and the user-interface module are configured to communicate data between one another.

9. A power tool system comprising:
   a power tool comprising:
   a rotatable tool holder configured to receive a work instrument;
   a motor adapted to drive the rotation of the tool holder;
   a housing containing at least the motor;
   a handle having a first end and a second end opposite the first end, the first end coupled to the housing to position the handle extending from the housing and to provide a grip to manipulate the tool;
   a power source detachably coupled to the second end of the handle and configured to deliver power to the motor;

an actuator configured to be actuated to select powered operation of the power tool; and a user-interface module comprising:
a digital display, a user input, and wireless communication capabilities; and
an input device for receiving programmable instruction,
wherein the user-interface module is detachably coupled directly to the housing via receipt of a fastener through an aperture formed through the user-interface module to interchangeably transition between an attached state and a detached state, wherein
in the attached state, the user-interface module is an integral part of the housing and creates a housing and user-interface module combination with the user-interface module configured to receive operational input and communicate the operational input to a controller of the tool to govern operational modes of the tool which results in a programmed operational mode of the tool in the attached state, the controller located within the housing, and
the detached state includes the user-interface module detached from the housing with the tool set in a pre-programmed default mode as a fixed tool such that the tool operates in the default mode, where the default mode of the tool is different from the programmed operational mode of the tool and operates according to pre-programmed operations stored in the controller of the tool,
wherein the tool is configured to revert to the default mode upon transitioning from the attached state to the detached state,
wherein the user-interface module is selectable between active and inactive states, and
wherein the user-interface module is a first user-interface module, and wherein the power tool further comprises a second user-interface module interchangeable with the first user-interface module, the second user-interface module configured to detachably couple with the housing separately from the first user-interface module, wherein when the second user-interface module is attached to the housing to create a second housing and user-interface module combination, the second housing and user-interface module combination enables the tool to be programmed via the second user-interface module such that the second housing and user-interface module combination provides operational input to the tool which results in a second programmed operational mode of the tool that is different from each of the default mode of the tool and the programmed operational mode of the tool.

10. The power tool of claim 9, wherein in the programmed operational mode the tool operates according to the operational unput.

11. The power tool of claim 9, wherein the user-interface module further comprises wireless communication capability.

12. The power tool of claim 9, wherein the programmable instruction comprises electric power characteristics, motor control characteristics, or operational mode status.

13. The power tool of claim 9, wherein the user-interface module is adapted to draw electric power from the power source.

14. The power tool of claim 9, wherein the power tool and the user-interface module are configured to communicate data between one another.

15. A method of operating a power tool comprising:
providing a power tool having a user-interface module comprising a digital display, a user input, and wireless communication capabilities configured to interchangeably transition between an attached state and a detached state, the power tool including a housing containing a motor, the power tool including a handle having a first end and a second end opposite the first end, the first end of the handle coupled to the housing, the power tool also including a power source detachably coupled to the second end of the handle and configured to deliver power to the motor, the attached state including the user-interface module integrally attached to the housing via receipt of a fastener through an aperture formed through the user-interface module to create a housing and user-interface module combination, the detached state including the user-interface module detached from the housing, the detached state providing a pre-programmed default mode of operation of the power tool according to pre-programmed operations stored in a controller of the tool, the controller located within the housing;
operating the power tool according to the default mode of operation with the user-interface module in the detached state;
detachably coupling the user-interface module to the housing of the power tool to provide the attached state;
reprogramming the operation of the power tool to a programmed operation mode stored in the controller through the user interface module in the attached state;
operating the power tool according to the programmed operation mode; and
reverting the tool to the default mode of operation as a result of detachably removing the user-interface module from the power tool,
wherein the user-interface module is a first user-interface module, and wherein the power tool further comprises a second user-interface module interchangeable with the first user-interface module, the second user-interface module configured to detachably couple with the housing separately from the first user-interface module, wherein when the second user-interface module is attached to the housing to create a second housing and user-interface module combination, the second housing and user-interface module combination enables the tool to be programmed via the second user-interface module such that the second housing and user-interface module combination provides operational input to the tool which results in a second programmed operational mode of the tool that is different from each of the default mode of operation of the tool and the programmed operation mode of the tool.

16. The power tool of claim 1, wherein the housing includes a first power communication link and a first data communication link, and the user-interface module includes a second power communication link and a second data communication link, wherein in the attached state, the first power communication link and the first data communication link are respectively coupled and in operative communication with the second power communication link and the second data communication link, and
wherein in the detached state, the uncoupling of the first power communication link and the first data communication link with the second power communication link and the second data communication link revert the tool to operate in the pre-programmed default mode.

17. The power tool of claim 16, wherein the second power communication link and the second data communication link are disposed on a back side of the user-interface module, opposite to the digital display.

18. The power tool of claim 1, wherein the user-interface module is configured to be fastened to the housing as an endcap.

19. The power tool system of claim 9, wherein the housing includes a first power communication link and a first data communication link, and the user-interface module includes a second power communication link and a second data communication link, wherein in the attached state, the first power communication link and the first data communication link are respectively coupled and in operative communication with the second power communication link and the second data communication link, and wherein in the detached state, the uncoupling of the first power communication link and the first data communication link with the second power communication link and the second data communication link revert the tool to operate in the pre-programmed default mode.

20. The power tool system of claim 19, wherein the second power communication link and the second data communication link are disposed on a back side of the user-interface module, opposite to the digital display.

21. The power tool system of claim 9, wherein the user-interface module is configured to be fastened to the housing as an endcap.

* * * * *